United States Patent
Daniels et al.

(10) Patent No.: US 10,782,156 B2
(45) Date of Patent: Sep. 22, 2020

(54) LINEAR VARIABLE DIFFERENTIAL TRANSFORMER (LVDT) CALIBRATION MECHANISM FOR PRECISION RIGGING WITH VIBRATION AND ACCURACY TRACKING ROBUSTNESS

(71) Applicant: Honeywell International Inc., Morris Plains, NJ (US)

(72) Inventors: Aaron Daniels, Echo, MI (US); Joe Walling, Boyne City, MI (US); Charles Licata, Morris Plains, NJ (US)

(73) Assignee: Honeywell International, Inc., Morris Plains, NJ (US)

( * ) Notice: Subject to any disclaimer, the term of this patent is extended or adjusted under 35 U.S.C. 154(b) by 0 days.

(21) Appl. No.: 16/279,773

(22) Filed: Feb. 19, 2019

(65) Prior Publication Data

US 2019/0186956 A1    Jun. 20, 2019

Related U.S. Application Data

(62) Division of application No. 15/446,895, filed on Mar. 1, 2017, now Pat. No. 10,247,579.

(51) Int. Cl.
| | | |
|---|---|---|
| *G01B 7/00* | (2006.01) | |
| *G01B 7/14* | (2006.01) | |
| *G01B 7/30* | (2006.01) | |
| *G01R 35/00* | (2006.01) | |
| *G01D 5/22* | (2006.01) | |
| *G01D 18/00* | (2006.01) | |

(52) U.S. Cl.
CPC ........... *G01D 5/2291* (2013.01); *G01D 18/00* (2013.01)

(58) Field of Classification Search
CPC ... G01B 7/00; G01B 7/14; G01B 7/30; G01R 35/00; G01D 18/00; G01D 5/22
See application file for complete search history.

(56) References Cited

U.S. PATENT DOCUMENTS

| | | | | |
|---|---|---|---|---|
| 4,543,732 A | * | 10/1985 | Maples | G01B 7/001 324/207.18 |
| 2002/0030486 A1 | * | 3/2002 | Kim | G01D 5/2291 324/207.18 |
| 2015/0040661 A1 | * | 2/2015 | Olson | G01F 23/60 73/313 |

* cited by examiner

*Primary Examiner* — Neel D Shah
(74) *Attorney, Agent, or Firm* — Craige Thompson; Thompson Patent Law

(57) ABSTRACT

Embodiments generally relate to assembly and methods for precisely rigging a linear variable differential transformer (LVDT). For example, the probe rod assembly of a dual tandem LVDT may comprise two moveable cores, a probe fitting, and a probe rod. Generally, the first moveable core may be configured to achieve electrical zero with its respective transformer. Without adjusting the position of the probe rod with respect to the one or more coils of wire, the second moveable core may be configured to achieve electrical zero with its respective transformer. This may ensure that both moveable cores simultaneously achieve electrical zero in the null position. Typically, the probe fitting may be configured to fit at a first end of the probe rod projecting outward from the outer housing. The disclosed assembly and methods may be used to precisely rig dual tandem LVDTs, single channel LVDTs, and dual parallel LVDTs.

24 Claims, 6 Drawing Sheets

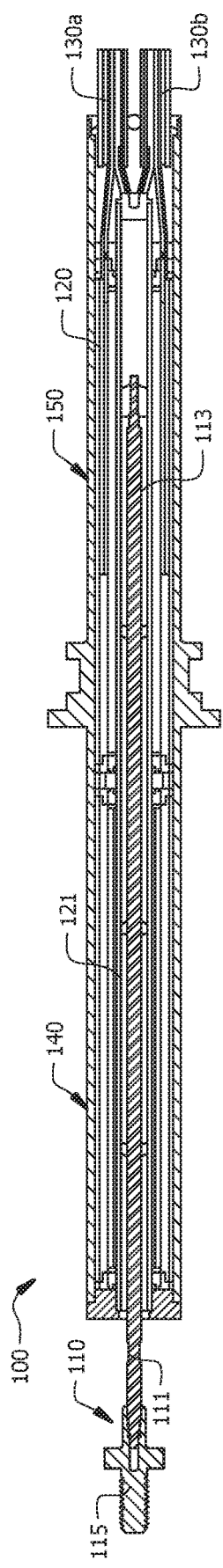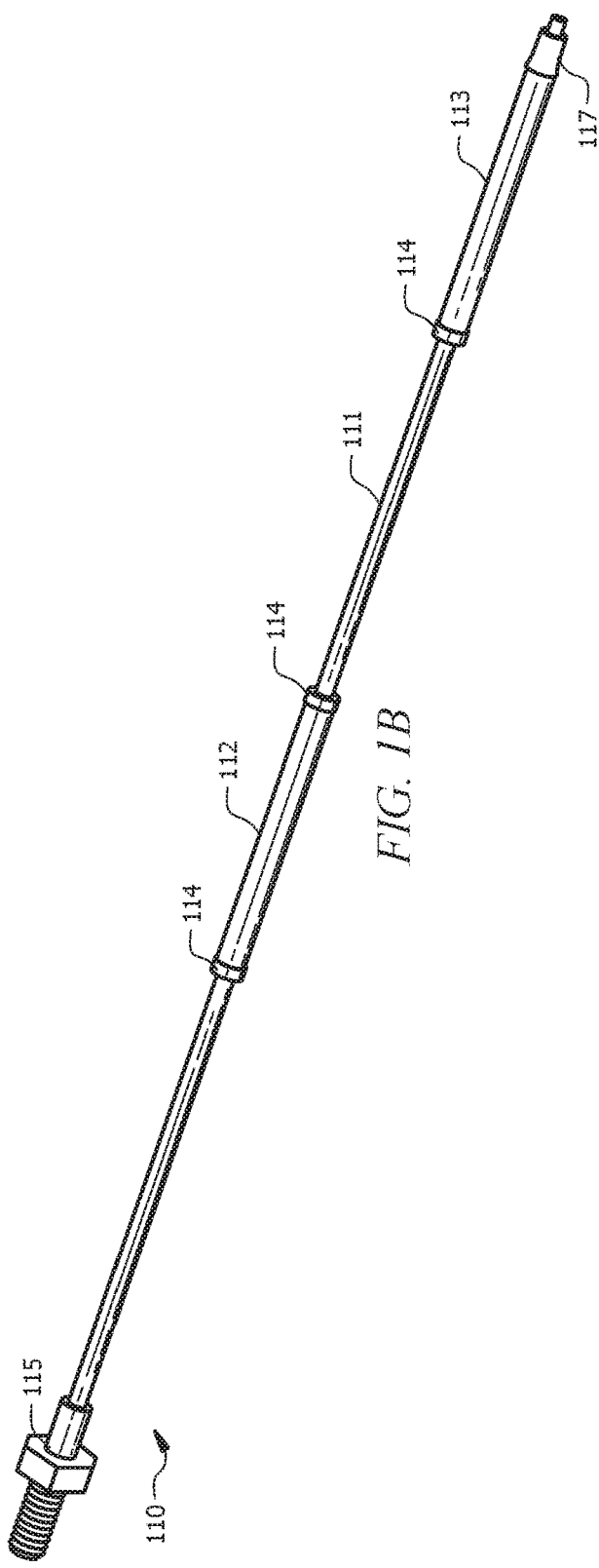
FIG. 1A
FIG. 1B

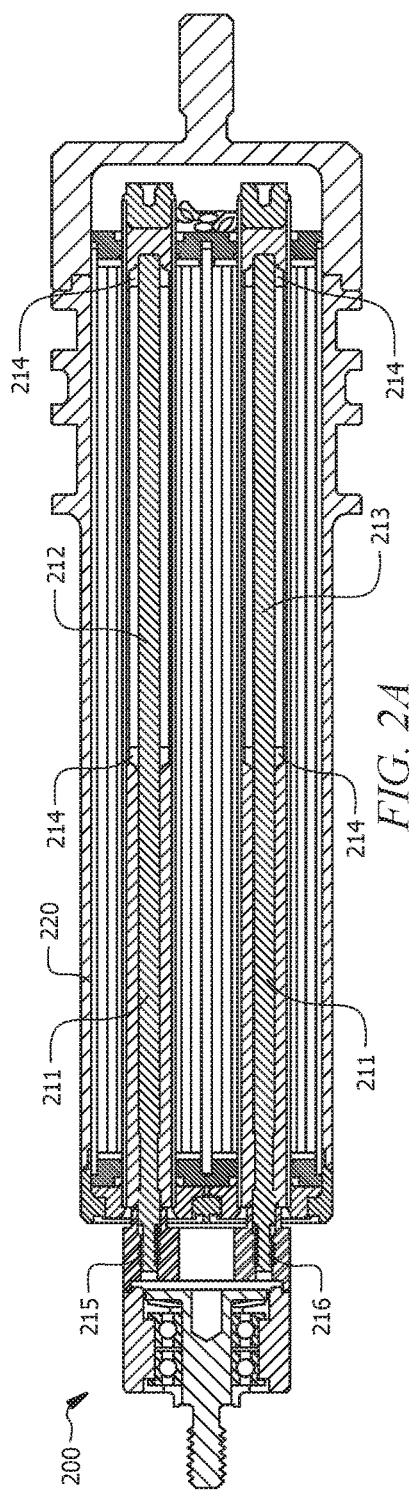
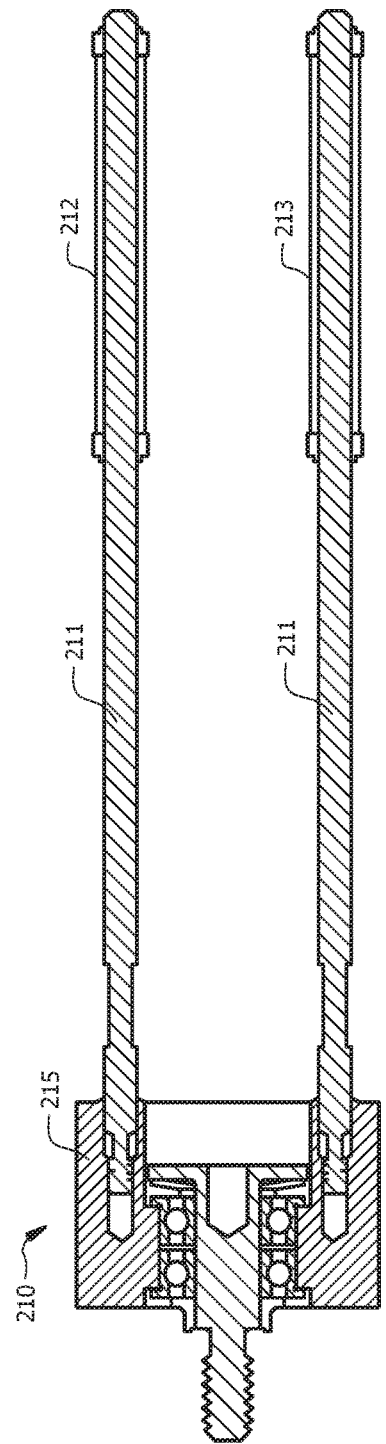
FIG. 2A
FIG. 2B

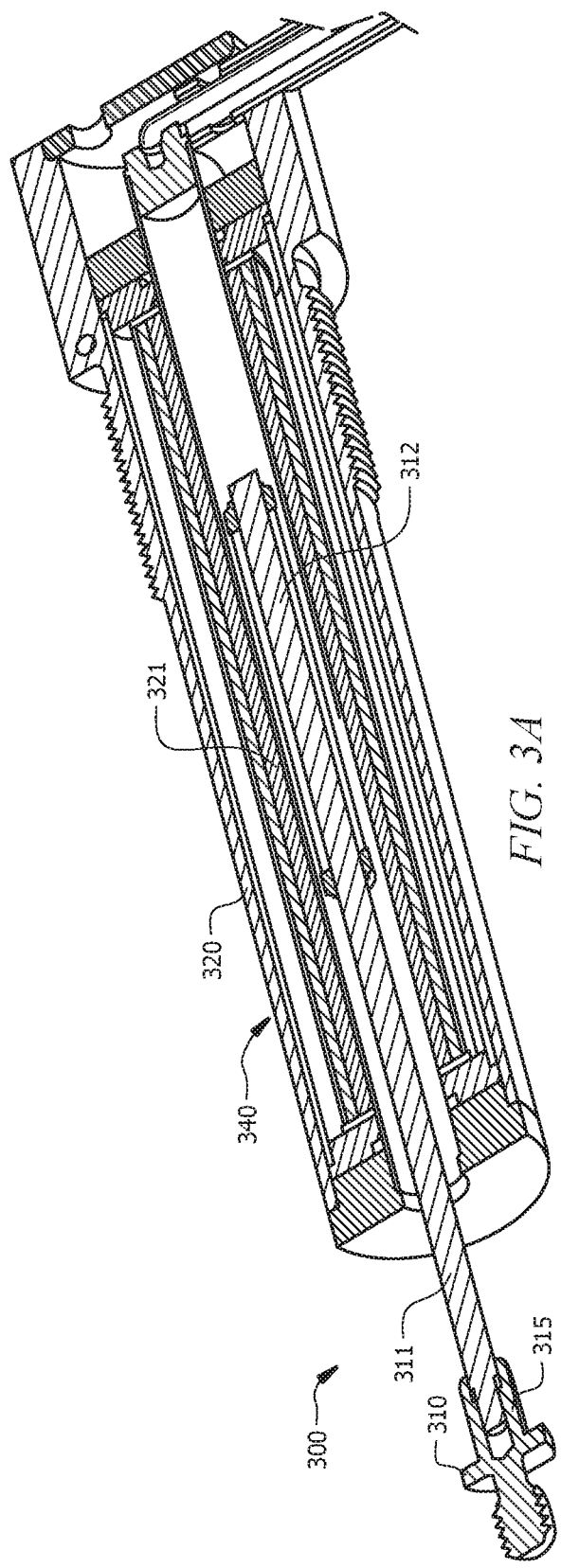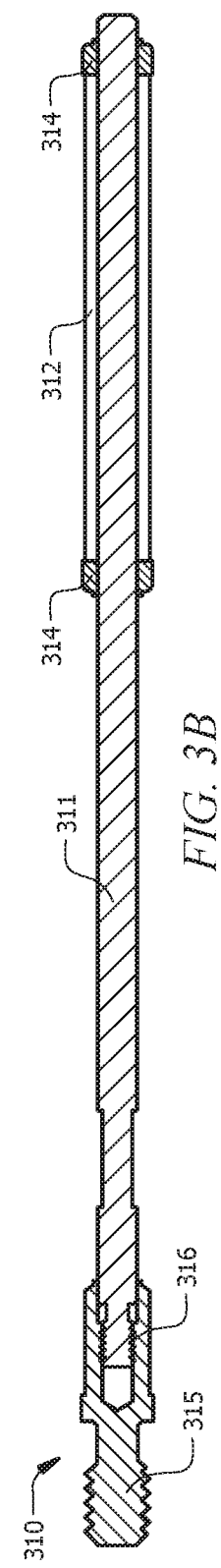

LINEAR VARIABLE DIFFERENTIAL TRANSFORMER (LVDT) CALIBRATION MECHANISM FOR PRECISION RIGGING WITH VIBRATION AND ACCURACY TRACKING ROBUSTNESS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD

The present disclosure relates to precision rigging of a linear variable differential transformer (LVDT).

BACKGROUND

In many industrial areas it may be necessary to measure movement and/or linear displacement of externally coupled objects. Typically, a linear variable differential transformer (LVDT) (also called linear variable displacement transformer) may be used to produce an electrical signal proportional to the displacement of a moveable core/slug (armature) within a transformer. LVDTs may often be utilized in the gaging and measuring arts to produce an electrical signal denoting location, size, or dimension. For example, LVDTs may be used within the aerospace industry to control the pitch on the blades of a helicopter to compensate for winds during flight. LVDTs may be used inside an actuator to accurately measure the movement and position of various elements used in stabilization.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1A illustrates a cross-sectional view of an exemplary embodiment of a dual tandem linear variable differential transformer (LVDT) comprising a probe rod assembly located within a housing comprising one or more coils of wire;

FIG. 1B illustrates a perspective view of an exemplary embodiment of a dual tandem LVDT probe rod assembly (similar to the exemplary probe rod assembly shown in FIG. 1A);

FIG. 2A illustrates a cross-sectional view of an exemplary embodiment of a dual parallel LVDT comprising a probe rod assembly located within a housing comprising one or more coils of wire;

FIG. 2B illustrates a schematic view of an exemplary embodiment of a dual parallel LVDT probe rod assembly (similar to the exemplary probe rod assembly shown in FIG. 2A);

FIG. 3A illustrates a cross-sectional view of an exemplary embodiment of a single channel LVDT comprising a probe rod assembly located within a housing comprising one or more coils of wire;

FIG. 3B illustrates a schematic view of an exemplary embodiment of a single channel LVDT probe rod assembly (similar to the exemplary probe rod assembly shown in FIG. 3A);

DETAILED DESCRIPTION

Figure 1C:
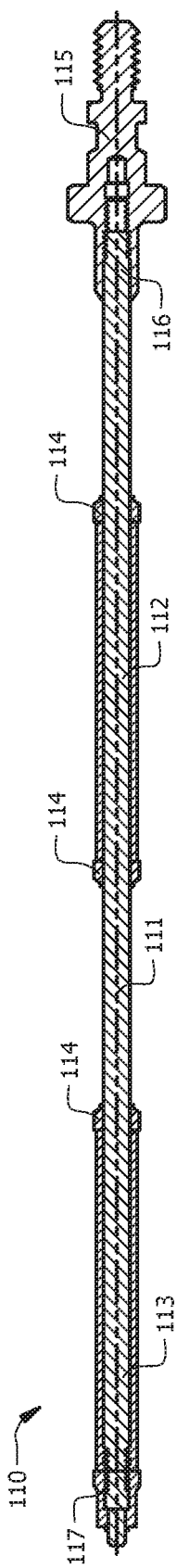
FIG. 1C illustrates a schematic view of an exemplary embodiment of a dual tandem LVDT probe rod assembly (similar to the exemplary probe rod assembly shown in FIG. 1A and FIG. 1B)

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, +/−10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The embodiments of this disclosure typically relate to a linear variable differential transformer (LVDT) to measure movement and/or linear displacement of externally coupled objects. Typically, a linear variable differential transformer (LVDT) (also called linear variable displacement transformer) may be used to produce an electrical signal proportional to the displacement of a moveable core/slug (armature) within a transformer. The transformer may comprise a central, primary coil winding and two secondary coil windings on opposite ends of the primary coil winding. In some embodiments, the primary coil winding and the secondary coil windings may be oriented in a different configuration but, typically, may accomplish the same purpose. Generally, the coil windings may be coaxial. Typically, the moveable core/slug may be positioned within the coil assembly. The moveable core/slug may provide a path for magnetic flux linking the primary coil to the secondary coils.

Typically, when the primary coil is energized with an alternating current, a cylindrical flux field may be produced over the length of the moveable core/slug. This flux field may produce a voltage in each of the two secondary coils that may vary as a function of the moveable core/slug position. Generally, moveable core/slug position may move the flux field into one secondary winding and out of the other secondary winding causing an increase in the voltage induced in one secondary winding and a corresponding voltage decrease in the other secondary winding. In some embodiments, the secondary coil windings may be connected in series with opposing phase. Thus, the net output of the LVDT may be the difference between the two secondary voltages. Generally, when the moveable core/slug is positioned symmetrically relative to the two secondary windings (at the "null" position), the differential output may be approximately zero, because the voltage of each secondary coil winding is equal but of opposite phase.

LVDTs may often be utilized in the gaging and measuring arts to produce an electrical signal denoting location, size, or dimension. For example, LVDTs may be used within the aerospace industry to control the pitch on the blades of a helicopter to compensate for winds during flight. In some embodiments, the LVDT may be used in actuators in flight control stabilization actuation, for fuel control in aerospace engine valves, active control clearance for pneumatic or hydraulic valves, valves or actuators used in auxiliary power units, door closures, starter air valve controls, variable stator vane actuators, variable bleed valve actuators, transient bleed valve actuators, thrust reversing actuators, brake actuators, landing gear actuators, flap/skew actuators, spoiler/aileron actuators, trim actuators, control of flight services, landing gear locks, level sensing, torque generators, and manifold valve actuation. LVDTs may be used inside an actuator to accurately measure the movement and position of various elements used in stabilization. Generally, within an actuator, as the pressure increases, the moveable core/slug may move toward one secondary winding and away from the other secondary winding. This may yield a voltage difference that may be proportional to the linear movement. Thus, the voltage output may measure pressure and position.

Therefore, to ensure accurate measurement of position, LVDTs may need to be precisely rigged to set the null position. Precision rigging of the LVDT assembly may decrease tracking, accuracy, and rigging error of the LVDT during use. Generally, due to constant movement of the elements of the LVDT during stabilization and the fact that a LVDT requires complex electrical measurement to achieve accurate displacement measurement, there may be concerns for thermal stability, precision rigging, and robustness to vibration for the materials/elements used in the LVDT assembly. Conventionally, precise rigging of an LVDT may be accomplished using various set length components to form the probe assembly of the LVDT. Typically, with various set length components, adjustment of the probe assembly may be limited (e.g. mobility of moveable/slug core may be restricted) and the process of setting the LVDT to its null position may require finding the electrical zero before setting the rig position. Additionally, conventional methods may cause difficulty in setting tracking between multi-channel devices because each channel may need to be set individually to compound tracking, accuracy, and rigging error. Additionally, with the use of various set length components, the LVDTs robustness to vibration may rely on factors such as fastening methods, component design, process selection, and designed assembly for the probe assembly of the LVDT. With a greater number of factors affecting the LVDTs robustness to vibration, there may be a decreased confidence in the LVDT performing accurately. Thus, generally, to offset the rigging error, manufacturers may rely on tolerance stack. In some conventional embodiments, LVDT probe assembly may rely on variable length components (e.g. shimming or maintaining precision component lengths) to accommodate for component differences in order to set rig position or set tracking between channels. However, this method may not offer improved vibration performance.

Disclosed embodiments relate to an LVDT precisely rigged to allow the null position and tracking between one or more channels of the LVDT to be set exactly at the electrical zero of the transformer. Typically, precision rigging may include redundant retention methods to lead to robust vibration. Additionally, a probe rod with an optimized outer diameter may be implemented to improve precision rigging. Typically, a probe rod with a large outer diameter may lead to cyclic failures (due to a relative inflexibility). Typically, a probe rod with a small outer diameter may cause the probe rod to bend and, potentially, break. Thus, it may be important to optimize the outer diameter of the probe rod as may be accomplished by the disclosed embodiments.

For example, in some embodiments, the position of the moveable core/slug on the probe rod may be carefully selected to control the direction of shift during use and to improve tracking between one or more channels of the LVDT assembly. In some embodiments, the LVDT probe rod assembly may be calibrated and precisely rigged using the following exemplary method. First, the first channel's magnetic core/slug may be welded, brazed, threaded, or crimped at a fixed position on the probe rod through the use of a protective spacer. The first channel's magnetic core/slug may be precisely dialed to its electrical zero with its respective transformer by using a modified thread between the probe fitting and the first channel's magnetic core/slug at the adjacent end of the probe rod. Typically, the second channel's magnetic core/slug may then be precisely set to its respective transformer's electrical zero through the use of another protective spacer with modified mating threads on the spacer (located at the opposite end of the probe rod from the probe fitting). This method of attaching/fastening the one or more moveable cores/slugs to the probe rod may allow for adjustment and retention as needed where the LVDT assembly may achieve a precisely configured null position. Typically, once the adjustments may be complete, the probe rod assembly may be permanently fastened to achieve zero null coincidence, precise rig position, robust vibration performance, and superior temperature tracking operation.

In some embodiments, the probe rod assembly may be configured for use within a dual tandem LVDT design, a dual parallel LVDT design, and/or a single channel LVDT design. Generally, precision rigging of the LVDT probe may vary depending on the type of LVDT design. However, typically, the LVDT calibration process may comprise similar steps regardless of the type of LVDT design. The steps of the calibration process may be performed in the order described; however, the calibration process may be performed in numerous other manners (e.g. in a different sequential order). Persons of skill should appreciate other methods of precisely rigging an LVDT probe rode assembly to achieve zero null coincidence, robust vibration, and superior temperature tracking.

In some embodiments, during calibration and assembly of the LVDT probe rod, the LVDT housing comprising the one or more coils may be paired with a probe rod. Typically, the part number (P/N) may be recorded/stored to ensure proper precision rigging of the probe rod takes place within a corresponding LVDT housing to form the LVDT. This process may ensure that slight deviations in the method of manufacturing the LVDT housing are accounted for while performing the calibration process (e.g. setting null position, ensuring null concurrents, etc.). Deviations between various LVDT housings may take place due to variations in the coil windings located within the housing. Persons of skill should appreciate other such deviations that may result from not properly pairing the LVDT housing and the LVDT probe rod during the calibration and assembly process. In some embodiments, the deviations (between similarly manufactured LVDT elements) may be considered negligible and pairing of the LVDT housing to the LVDT probe rode assembly may not be required.

Generally, a dual tandem LVDT design may comprise two moveable cores/slugs attached to a probe rod. Typically, a dual tandem LVDT may comprise two LVDTs combined within a single transducer such that there may be two output signals. Typically, dual tandem LVDTs may be more reliable because failure in both output signals is highly improbable. A dual tandem LVDT may increase redundancy of the LVDT proving especially useful for applications involving aircraft and missile control systems. To implement both LVDTs into one probe rod assembly may be a complex task. Generally, each moveable core/slug may need to be aligned with its corresponding, respective channel such that both moveable cores/slugs achieve electrical zero. In some embodiments, the first channel's moveable core/slug may be precisely dialed to its electrical zero with its respective transformer. Generally, this may be accomplished by using a modified thread between the probe fitting and the first channel's moveable core/slug. Typically, the first channel's moveable core/slug may be permanently attached with reference dimensions towards the center of the probe rod. Once the first channel's moveable core/slug achieves its electrical zero, the probe fitting may be permanently attached to the probe rod. The second channel's moveable core/slug may be adjusted using a protective spacer with optional mating threads on the spacer (located at the opposite end of the probe rod from the probe fitting).

In some embodiments, the probe rod assembly may be assembled in a different order. For example, the first channel's moveable core/slug may be aligned to achieve its electrical zero, and then the second channel's moveable core/slug may be aligned on the probe rod to achieve its electrical zero while maintaining the first channel's moveable core's/slug's electrical zero. The probe fitting may be aligned last. Typically, the manner by which the two moveable cores/slugs may be aligned may vary and, yet, accomplish the same purpose. Generally, either the first channel's moveable core/slug or the second channel's moveable core/slug may be used as the reference by which to align the other corresponding elements. During calibration, the second channel's moveable core/slug may be limited in motion by the presence of a current clamp at one end of the probe rod.

In some embodiments, the one or more moveable cores/slugs and the probe fitting may be temporarily attached to the probe rod during the calibration process. Typically, temporary attachment may comprise using one or more spacers attached to each end of the moveable core/slug. Additionally, the probe fitting may be temporarily attached to the probe rod by using a modified thread (e.g. by screwing the probe fitting onto the probe rod). In some embodiments, to improve robustness to vibration, the one or more moveable cores/slugs and the probe fitting may be permanently attached to the probe rod during the calibration process and/or after the calibration process is complete. Typically, permanent attachment may comprise welding (e.g. friction welding), brazing, threading, or crimping the one or more moveable cores/slugs and/or the probe fitting onto the probe rod. In some embodiments, an adhesive such as epoxy may be used for permanent attachment of the one or more moveable cores/slugs and/or the probe fitting. In some embodiments, multiple methods of permanent attachment may be used. In this disclosure, "permanently" and/or "permanent" attachment means that it may be possible to use force to detach the one or moveable cores/slugs and/or the probe fitting from the probe rod. However, this method of removal may effectively damage the probe rod assembly. In other words, "permanently" and/or "permanent" attachment means that it would be very inconvenient to remove the one or more moveable cores/slugs and/or the probe fitting and may require the User and/or Manufacturer to dispose of the probe rod assembly in the instance removal or reorientation of the one or more moveable cores/slugs and/or the probe fitting is required. Thus, typically, permanent attachment of the one or more moveable cores/slugs and/or the probe fitting may take place after calibration (and, optionally, the accuracy test) is complete.

Generally, either both sides of the moveable core/slug or one side of the moveable core/slug may be permanently attached to the probe rod. Typically, permanent attachment of both sides of the moveable core/slug may potentially lead to imbalance of the probe rod assembly. Additionally, permanent attachment of both sides of the moveable core/slug may lead to problems arising due to temperature variation. For example, due to a temperature increase, the moveable core/slug may not be able to expand and contract freely which may lead to the inability to achieve zero null coincidence. Typically, permanent attachment of one side of the moveable core/slug may be seen as more favorable. This may be because the moveable core/slug may be purposefully end balanced. Additionally, with only one side of the moveable core/slug requiring permanent attachment, the error of wrongfully attaching the moveable core/slug to the probe rod may be reduced. In other words, the chances of error are reduced in half since only one side may require permanent attachment rather than both sides requiring permanent attachment. Additionally, the moveable core/slug may expand and contract freely with the probe rod assembly as the temperature increases or decreases. In some embodiments, the coefficient of thermal expansion (CTE) for the probe rod and the moveable core/slug may be the same to allow for equivalent changes (e.g. lengthening, shortening, etc.) arising from temperature variation. While persons of skill should understand the disclosed embodiments based on the above disclosure, the following figures may provide specific examples that may further clarify the disclosure.

Turning now to the drawings, FIG. 1A illustrates a cross-sectional view of an exemplary embodiment of a dual tandem linear variable differential transformer (LVDT) 100 comprising a probe rod assembly 110 located within a housing 120 comprising one or more coils 121. Typically, a dual tandem LVDT 100 may comprise two LVDTs combined within a single transducer such that there may be two output signals 130*a*, 130*b*. Typically, dual tandem LVDTs

100 may be more reliable because failure in both output signals 130*a*, 130*b* is highly improbable. In the exemplary embodiment of FIG. 1A, the dual tandem LVDT 100 comprises a housing 120 having a longitudinal bore within which the probe rod assembly 110 may be configured to move axially with respect to the housing 120. Typically, the probe rod assembly 110 of a dual tandem LVDT 100 may comprise a probe fitting 115 and two moveable cores/slugs 112, 113. As shown in the embodiment of FIG. 1A, one end of the probe rod 111 may fit within the longitudinal bore of the housing 120 and the other end of the probe rod 111 (comprising the probe fitting 115) may extend outward from the longitudinal bore of the housing 120. Additionally, a dual tandem LVDT 100 may comprise two channels 140, 150. The first channel 140 (located closer to the probe fitting 115) may comprise the first moveable core/slug 112 and the second channel 150 (located closer to the opposite end of the probe rod 111 away from the probe fitting 115) may comprise the second moveable core/slug 113. Generally, each moveable core/slug 112, 113 may need to be aligned with its corresponding, respective channel 140, 150 such that both moveable cores/slugs 112, 113 achieve electrical zero.

FIG. 1B illustrates a perspective view of an exemplary embodiment of a dual tandem LVDT probe rod assembly 110 (similar to the exemplary probe rod 110 assembly shown in FIG. 1A). Generally, the probe fitting 115 and the two moveable cores/slugs 112, 113 may be configured to slide and/or screw onto the probe rod 111. Generally, each moveable core/slug 112, 113 may comprise a spacer 114 attached to both ends of the moveable core/slug 112, 113. In some embodiments, as in the exemplary embodiment of FIG. 1B, the moveable core/slug 113 of the second channel may comprise an adjustment spacer 117. Typically, the adjustment spacer 117 may be longer/larger to allow the second moveable core/slug 113 a greater extent of movement. Additionally, the adjustment spacer 117 may comprise threaded ends such that it may be tightened or loosened accordingly. In some embodiments, the ratio of the rod 111 diameter to the moveable core/slug 112, 113 diameter may be optimized to increase vibration and accuracy tracking robustness.

FIG. 1C illustrates a schematic view of an exemplary embodiment of a dual tandem LVDT probe rod assembly 110 (similar to the exemplary probe rod assembly 110 shown in FIG. 1A and FIG. 1B). During assembly, generally, each moveable core/slug 112, 113 may need to be aligned with its corresponding, respective channel such that both moveable cores/slugs 112, 113 achieve electrical zero. Thus, in the exemplary embodiment of FIG. 1C, the moveable core/slug 112, 113 may be precisely dialed to its respective transformer's electrical zero. Typically, this may be accomplished by using the modified thread 116 between the probe fitting 115 and the first channel's moveable core/slug 112. Typically, the first channel's moveable core/slug 112 may be permanently attached with reference dimensions towards the center of the probe rod 111. In the exemplary embodiment of FIG. 1C, the first channel's moveable core/slug 112 may be permanently attached to the probe rod 111 using friction welding. In some embodiments, the moveable core/slug 112, 113 may be welded on both sides or only on one side. Once the first channel's moveable core/slug 112 achieves its electrical zero (e.g. by sliding the probe rod 111 within the housing until the transformer indicates electrical zero has been achieved), the probe fitting 115 may be permanently attached to the probe rod 111. In the exemplary embodiment of FIG. 1C, the probe fitting 115 comprises threading 116 to allow it to screw onto the probe rod 111. In some embodiments, the probe fitting 115 may further be welded onto the probe rod 111 to increase robustness to vibration. The second channel's moveable core/slug 113 may be adjusted using a protective spacer 114 with optional mating threads on the adjustment spacer 117 (located at the opposite end of the probe rod 111 from the probe fitting 115) (similar to the attachment of the first channel's moveable core/slug 112). Typically, this may allow the second channel's moveable core/slug 113 to remain affixed to the probe rod 111. Generally, the second channel's moveable core/slug 113 may be aligned with its respective transformer to achieve electrical zero after alignment of the first channel's moveable core/slug 112 and the probe fitting 115 is complete. Generally, after calibration of the probe rod assembly 110 is complete (and, optionally, the probe rod assembly 110 passes an accuracy test), all elements of the probe rod assembly 110 may be welded. Typical areas of permanent attachment (e.g. welding) are indicated in the exemplary embodiment of FIG. 1C by the presence of spacers 114, 117. However, not all areas indicated may comprise permanent attachment. For example, only one side of both moveable cores/slugs 112, 113 may be permanently attached to the probe rod 111 rather than both sides being permanently attached to the probe rod 111.

FIG. 2A illustrates a cross-sectional view of an exemplary embodiment of a dual parallel LVDT 200 comprising two probe rods 211 located within a housing 220 comprising one or more coils 221. Typically, a dual parallel LVDT 200 may comprise two output signals which may be useful in case of failure in one of the probe rods 211. Generally, each probe rod 211 may be permanently attached to a shared probe fitting 215. In the exemplary embodiment of FIG. 2A, the probe rods 211 are shown to be screwed (via threads 216) into the probe fitting 215. However, in some embodiments, the probe rods 211 may be permanently attached to the probe fitting 215 using methods such as frictional welding. Additionally, in the exemplary embodiment of FIG. 2A, each probe rod 211 comprises a moveable core/slug 212, 213. Typically, the moveable core/slug 212, 213 may be calibrated within the housing 220 to ensure that zero null coincidence is achieved. In some cases, each moveable core/slug 212, 213 may be calibrated individually (for example, one moveable core/slug 212 may be calibrated within its channel and then the other moveable core/slug 213 may be calibrated within its respective channel). Generally, each moveable core/slug 212, 213 may comprise a spacer 214 attached on either end. The spacer 214 may serve to hold the moveable core/slug 212, 213 in place (e.g. frictional support) during the calibration process. In some embodiments, once calibration is complete, the spacers 214 on each side of the moveable core/slug 212, 213 may be permanently attached (e.g. welded) to the respective probe rod 211. Typically, in the case of welding, the spacer 214 may comprise a material compatible to be laser welded to the probe rod 211.

FIG. 2B illustrates a schematic view of an exemplary embodiment of a dual parallel LVDT probe rod assembly 210 (similar to the exemplary probe rod assembly shown in FIG. 2A). Generally, each probe rod 211 may be attached to a shared probe fitting 215, and each probe rod 211 may comprise a moveable core/slug 212, 213. Typically, the magnetic core/slug 212, 213 may be located near the end of the probe rod 211. However, the distance of the moveable core/slug 212, 213 from the end of the probe rod 211 may be more specifically determined during the calibration process. Typically, during the calibration process, the probe rod assembly 210 may be loaded into a test stand. The voltage for each channel may be measured, and if the measured voltage is less than a particular threshold, then the moveable core/slug 212, 213 may be permanently attached to its respective probe rod 211 (as discussed in reference to FIG. 2A).

FIG. 3A illustrates a cross-sectional view of an exemplary embodiment of a single channel LVDT 300 comprising a probe rod assembly 310 located within a housing 320 comprising one or more coils 321. Generally, the single channel LVDT 300 may comprise a similar calibration process as compared to the dual parallel LVDT 200. However, since a single channel LVDT 300 comprises a single probe rod 310 with a moveable core/slug 312, only one channel 340 may require calibration. Additionally, the single channel LVDT 300 may provide only one output signal. Generally, the method of permanent attachment and attachment of the probe fitting 315 to the probe rod 311 may be similar to the method described in reference to FIG. 1A-FIG. 2B.

FIG. 3B illustrates a schematic view of an exemplary embodiment of a single channel LVDT probe rod assembly 310 (similar to the exemplary probe rod assembly 310 shown in FIG. 3A). Typically, the moveable core/slug 312 may be attached near one end of the probe rod 311 while the probe fitting 315 may be attached (e.g. screwed via threads 316) to the other end of the probe rod 311. The probe fitting 315 comprise threads 316 to allow removable attachment of the probe rod 311. Additionally, the probe fitting 315 may be permanently attached (e.g. welded) to the probe rod 311. Attachment of the moveable core/slug 312 to the probe rod 311 may vary depending on whether or not calibration has been completed. Generally, during the calibration process, one or more spacers 314 may be attached to either end of the moveable core/slug 312. Typically, the spacers 314 may serve as frictional support of the moveable core/slug 312 to the probe rod 311 such that the moveable core/slug 312 may not move freely. In other words, the spacers 314 may snugly hold the moveable core/slug 312 onto the probe rod 311. Additionally, once calibration is complete, the one or more spacers 314 may be permanently attached to the probe rod 311. Typically, the spacer 314 may comprise a material compatible with the material of the probe rod 311 such that laser welding may take place.

Figure 4A:
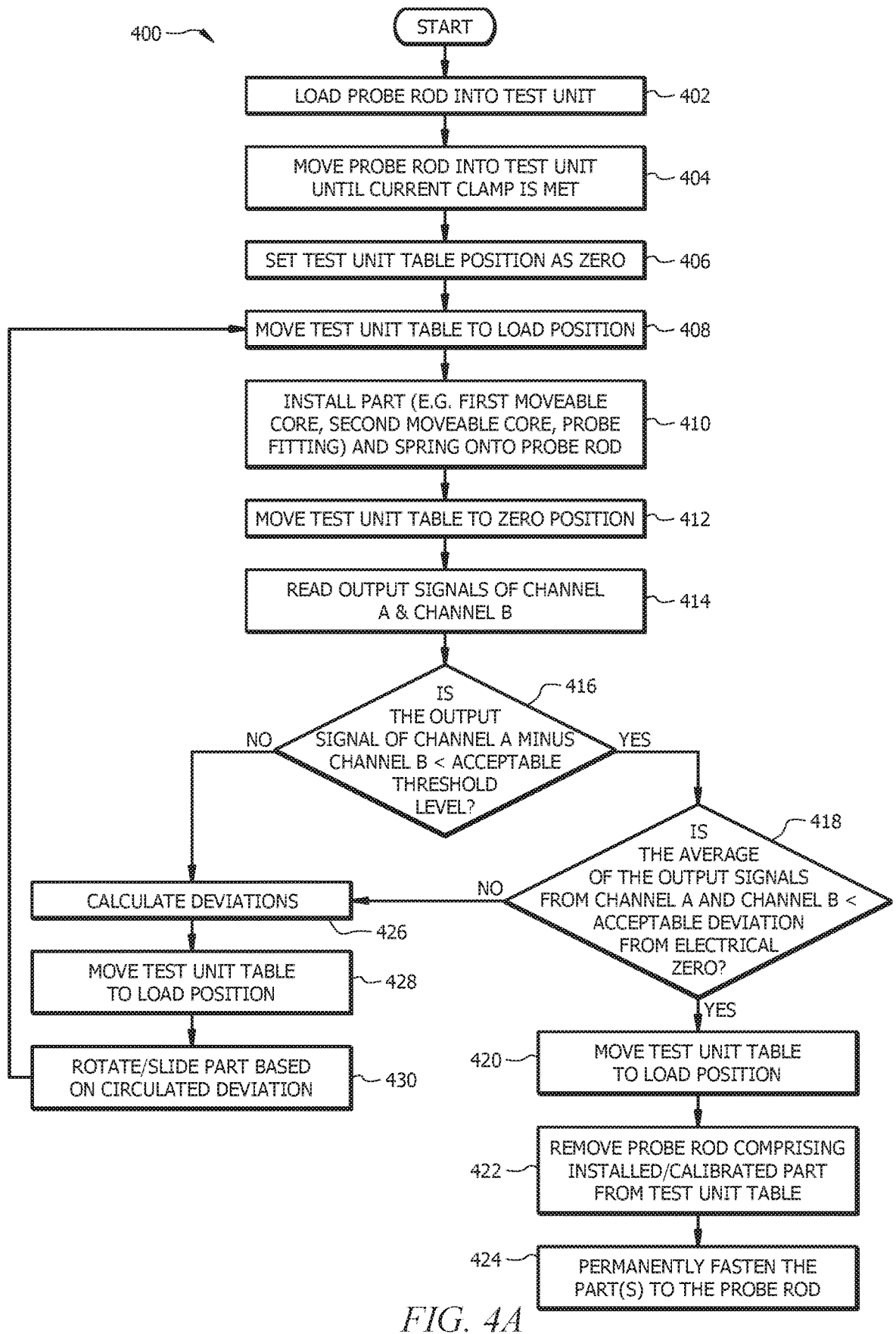
FIG. 4A illustrates a flowchart of an exemplary method of calibrating a dual tandem LVDT.

FIG. 4A illustrates a flowchart of an exemplary method of performing calibration for a dual tandem LVDT. Generally, the calibration process may take place within a test unit having a housing with one or more coils of wire. Typically, the housing with the one or more coils of wire may be associated with the particular probe rod assembly to ensure proper precision rigging of each LVDT. Thus, the Operator of the test unit may store the part number of the probe rod assembly to match with the housing within which the test may take place. Once this is complete, the probe rod may be loaded into the test unit and moved until the current clamp is met. The test unit table position may be set as zero and moved into the load position. In the load position, the part (e.g. first moveable core, second moveable core, probe fitting, etc.) being calibrated and the spring may be loaded onto the probe rod. The test unit table may be moved to the zero position, and the Operator may read the output signals from both Channel A and Channel B. If the difference between the output signals from Channel A and Channel B is less than an acceptable threshold level (e.g. 0.0005, 0.001, 0.005, etc.), then the Operator may check to determine if the average of the output signals from Channel A and Channel B is less than the acceptable deviation from electrical zero (e.g. 0.0003, 0.001, 0.0002, 0.0015, etc.). If the difference between the output signals between the two channels does not meet the acceptable threshold level and/or the acceptable deviation from electrical zero, then the deviation from the acceptable threshold level and/or the deviation from electrical zero may be calculated. The Operator may then move the test unit table to load position and rotate/slide the part undergoing calibration based on the calculated deviations. Once the part may be adjusted, the Operator may move the test unit table to the zero position and, once again, read the output signals to determine if the acceptable threshold level and the acceptable deviation from electrical zero is met. Generally, if both of these standards are met, the Operator may remove the probe rod comprising the calibrated part from the test unit table and permanently fasten the calibrated part to the precise location on the probe rod. Typically, this procedure may be followed in part by the single channel LVDT and the dual parallel LVDT. In the case of the single channel LVDT, only one output signal may be transmitted. In this case, the Operator may only tweak the location of the part being calibrated to ensure it does not exceed the acceptable deviation from electrical zero. Generally, this may be the case for a dual parallel LVDT. However, in the case of a dual parallel LVDT, the Operator may need to check to see if the acceptable deviation from electrical zero is being met by the parts (e.g. moveable core) within both channels. Generally, within a single channel LVDT and a dual parallel LVDT, a difference between the output signals may not be determined. Thus, there may be no need to determine if the acceptable threshold level for the difference is met.

Figure 4B:
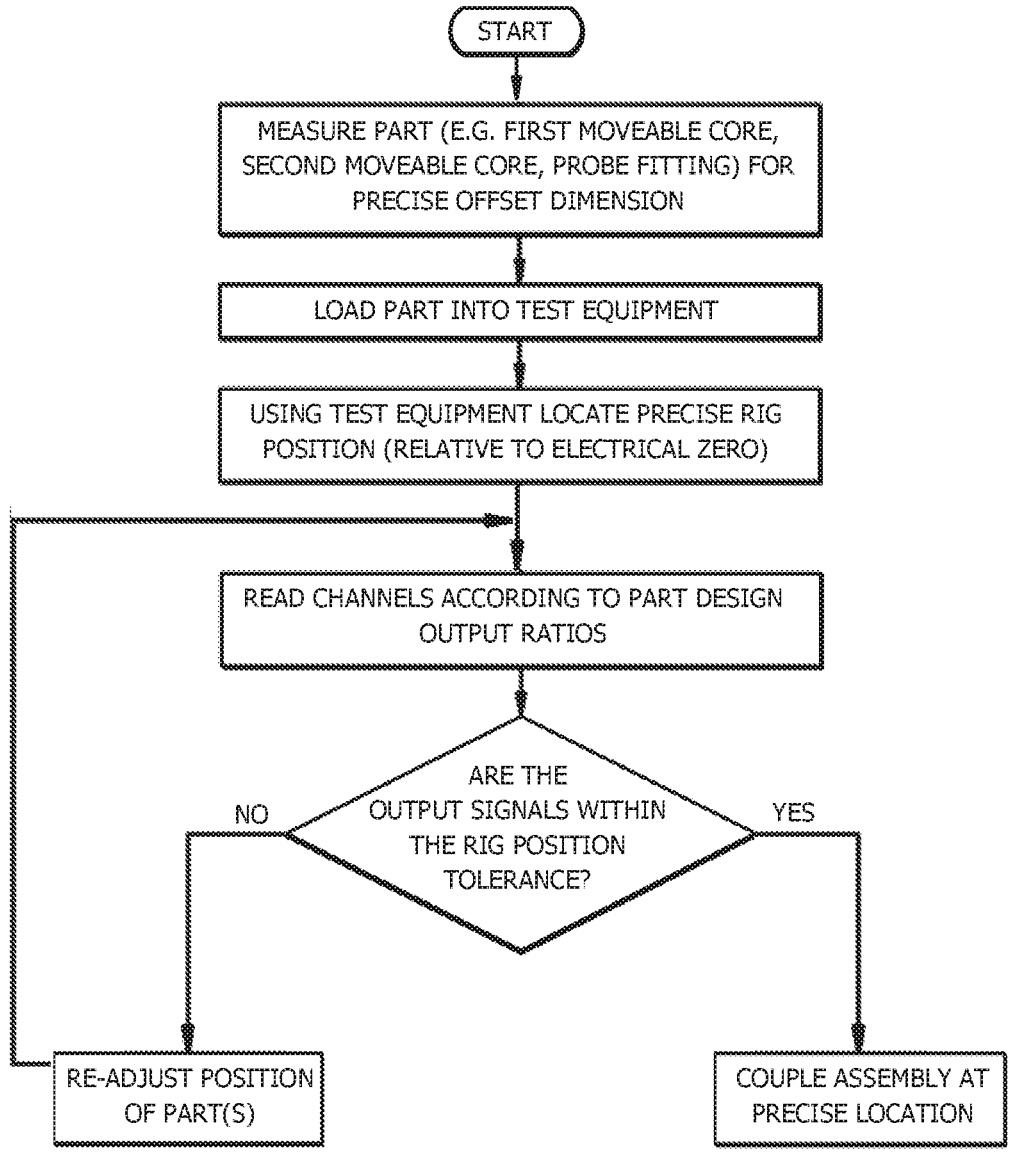
FIG. 4B illustrates a simplified flowchart of an exemplary method of performing calibration (similar to the exemplary flowchart of FIG. 4A).

FIG. 4B illustrates a simplified flowchart of an exemplary method of performing calibration (similar to the exemplary flowchart of FIG. 4A). Typically, the probe rod and/or additional parts (such as the first moveable core, the second moveable core, and probe fitting) may be measured to determine precise offset dimension. This may improve accuracy during the calibration process since not all parts may be assembled/manufactured with precisely equal dimensions. Generally, the calibration process may take place within a test unit having a housing with one or more coils (similar to the process described in reference to FIG. 4A). The part may be loaded into the test unit/equipment and may be adjusted to precise rig position. Typically, the goal may be to achieve electrical zero. Thus, the User/Operator may adjust the position of the part until electrical zero is achieved. This process may include reading the channel outputs of the part and comparing the output signal(s) to determine whether or not the output signal(s) fit within a rig position tolerance (e.g. within 0.0005, 0.001, 0.005, etc. from electrical zero). Typically, when the output signal(s) do not meet the rig position tolerance, the deviation from rig position tolerance may be calculated, and the position of the part (e.g. first moveable core, second moveable core, probe fitting) with respect to the respective transformer may be adjusted accordingly. Once the part(s) achieve output signal(s) meeting the rig position tolerance, the part(s) may be coupled to the precise location.

In some embodiments, the calibration procedure may be followed up with an accuracy test. Typically, for the dual tandem LVDT, the accuracy test may comprise gathering voltage data from both channels along the entire length of the probe rod. Generally, by doing so, the Operator may be able to determine if the acceptable threshold and the acceptable deviation from electrical zero is being met. Additionally, this procedure may potentially allow the Operator to implement signal conditioning circuitry to correct for potential errors that may arise, for example due to changes in temperature (e.g. if the deviation is too high, the signal conditioning circuitry may correct for the deviation). Typically, the accuracy test may be completed for the single channel LVDT and the dual parallel LVDT. As with the calibration test, the accuracy test may check to see if the voltage being measured complies with the acceptable deviation from electrical zero.

Having described device embodiments above, especially with regard to the figures, various additional embodiments can include, but are not limited to the following:

In a first embodiment, a (dual tandem) linear variable differential transformer (LVDT) comprising: an outer housing comprising one or more coils of wire, wherein the one or more coils of wire are arranged to form a plurality of transformers, and wherein each transformer of the plurality of transformers defines a channel; a probe rod operable to fit within an opening in the outer housing (and operable to move with respect to the outer housing); a first moveable core and a second moveable core coupled to the probe rod, wherein the second moveable core is adjacent to an end spacer coupled to a first end of the probe rod; and a probe fitting coupled to a second end of the probe rod, wherein the second end of the probe rod projects outward from the outer housing, wherein the first moveable core is coupled to the probe rod between the second moveable core and the probe fitting, and wherein the location of the second moveable core depends on the location of the probe fitting and the first moveable core. A second embodiment can include the LVDT of the first embodiment, wherein the LVDT comprises a first channel and a second channel, wherein the first moveable core is configured to achieve electrical zero with respect to the first channel, and wherein the second moveable core is configured to achieve electrical zero with respect to the second channel. A third embodiment can include the LVDT of the first to second embodiments, further comprising one or more spacers, wherein the one or more spacers are configured to be disposed on the probe rod on either side of the first moveable core and the second moveable core. A fourth embodiment can include the LVDT of the first to third embodiments, wherein the probe fitting, the first moveable core, and the second moveable core are fixedly attached to the probe rod. A fifth embodiment can include the LVDT of the first to fourth embodiments, wherein the fixed attachment comprises at least one of: welding, brazing, crimping, adhesive, threading, or combinations thereof. A sixth embodiment can include the LVDT of the first to fifth embodiments, wherein the one or more spacers comprise a material compatible for welding to the probe rod. A seventh embodiment can include the LVDT of the first to sixth embodiments, wherein the one or more spacers comprise a friction element configured to form a friction fit to hold the two moveable cores to the probe rod. An eighth embodiment can include the LVDT of the first to seventh embodiments, wherein the probe rod comprises a material with a coefficient of thermal expansion (CTE) matched to a CTE of the outer housing. A ninth embodiment can include the LVDT of the first to eighth embodiments, wherein the first moveable core and the second moveable core comprise a material that has a relatively high magnetic permeability. A tenth embodiment can include the LVDT of the first to ninth embodiments, wherein at least one end of the first moveable core or the second moveable core is permanently attached to the probe rod. An eleventh embodiment can include the LVDT of the first to tenth embodiments, wherein the first moveable core and the second moveable core simultaneously achieve electrical zero at a zero position of the LVDT. A twelfth embodiment can include the LVDT of the first to eleventh embodiments, wherein the end spacer is one of the one or more spacers and is a threaded end spacer, wherein the threaded end spacer comprises flats along half of the diameter to allow for adjustment along the length of the probe rod. A thirteenth embodiment can include the LVDT of the first to twelfth embodiments, wherein the first moveable core and the second moveable core are each coupled to the probe rod on a same end. A fourteenth embodiment can include the LVDT of the first to thirteenth embodiments, wherein the one or more coils of wire within each transformer are coupled to the outer housing and correspond to the coupling between the first moveable core and the probe rod and the second moveable core and the probe rod. A fifteenth embodiment can include the LVDT of the first to fourteenth embodiments, wherein a (single channel) linear variable differential transformer (LVDT) comprises: an outer housing comprising one or more coils of wire, wherein the one or more coils of wire are arranged to form a transformer, and wherein the transformer defines a channel; a probe rod operable to fit within an opening in the outer housing (and operable to move with respect to the outer housing); a moveable core coupled to the probe rod, wherein the moveable core is coupled adjacent to a first end of the probe rod; and a probe fitting coupled to a second end of the probe rod, wherein the second end of the probe rod projects outward from the outer housing, wherein the location of the moveable core depends on the location of the probe fitting. A sixteenth embodiment can include the LVDT of the first to fifteenth embodiments, wherein a (dual parallel) linear variable differential transformer (LVDT) comprises: an outer housing comprising one or more coils of wire, wherein the one or more coils of wire are arranged to form a first transformer within a first channel of the outer housing and a second transformer within a second channel of the outer housing; a first probe rod operable to fit through an opening in the outer housing and into the first channel of the outer housing; a second probe rod operable to fit through an opening in the outer housing and into the second channel of the outer housing, wherein the second channel of the outer housing is configured to lay parallel to the first channel of the outer housing; a first moveable core coupled to the first probe rod, wherein the first moveable core is coupled adjacent to a first end of the first probe rod; a second moveable core coupled to the second probe rod, wherein the second moveable core is coupled adjacent to a first end of the second probe rod; and a probe fitting coupled to a second end of the first probe rod and to a second end of the second probe rod, wherein the probe fitting projects outward from the outer housing, and wherein the location of the probe fitting relative to the first probe rod and the second probe rod depends on the positioning of the first moveable core and the second moveable core on each respective probe rod.

Exemplary embodiments might also relate to a method for calibrating a LVDT (e.g. similar to those described above, which may be considered optionally incorporated herein with respect to the discussion of the system). Such method embodiments, for example, might include, but are not limited to, the following:

In a seventeenth embodiment, a method for calibrating a linear variable differential transformer (LVDT), the method comprising: fixedly coupling a first moveable core onto a probe rod; inserting the probe rod with the first moveable core into a housing comprising one or more coils of wire, wherein the one or more coils of wire are arranged to form a plurality of transformers; aligning a position of the first moveable core with respect to a first transformer of the plurality of transformers; adjusting a position of a probe fitting on the probe rod with respect to the aligning of the position of the first moveable core to the first transformer of the plurality of transformers; fixedly coupling the probe fitting to the probe rod; adjusting a second moveable core on the probe rod; aligning a position of the second moveable core with respect to a second transformer of the plurality of transformers based on the aligning of the position of the first moveable core to the first transformer; and fixedly coupling the second moveable core to the probe rod after aligning the second moveable core relative to the second transformer. An eighteenth embodiment can include the method of the seventeenth embodiment, wherein the LVDT comprises a dual tandem LVDT. A nineteenth embodiment can include the method of the seventeenth to eighteenth embodiments, wherein fixedly coupling the first moveable core, the second moveable core, and the probe fitting to the probe rod comprises at least one of: welding, brazing, crimping, adhesive, threading, or combinations thereof. A twentieth embodiment can include the method of the seventeenth to nineteenth embodiments, wherein at least one end of the first moveable core and the second moveable core is permanently attached to the probe rod. A twenty-first embodiment can include the method of the seventeenth to twentieth embodiments, wherein inserting the probe rod into the housing comprises moving the probe rod into the housing until a current clamp is met. A twenty-second embodiment can include the method of the seventeenth to twenty-first embodiments, wherein alignment of the first moveable core within the first transformer and alignment of the second moveable core within the second transformer comprises sliding the first moveable core and the second moveable core until electrical zero (e.g. null position) is achieved with respect to the first transformer and the second transformer, respectively. A twenty-third embodiment can include the method of the seventeenth to twenty-second embodiments, wherein at a zero position (e.g. null position/electrical zero achieved by the first moveable core and the second moveable core), the difference between the output signal of the first transformer and the output signal of the second transformer is less than an acceptable threshold level. A twenty-fourth embodiment can include the method of the seventeenth to twenty-third embodiments, wherein when the difference between the output signal of the first transformer and the output signal of the second transformer is greater than the acceptable threshold level, the deviation from the acceptable threshold level is calculated, and the position of the first moveable core, the second moveable core, or the probe fitting is adjusted accordingly. A twenty-fifth embodiment can include the method of the seventeenth to twenty-fourth embodiments, wherein the average of the output signal from the first transformer and the average of the output signal from the second transformer is less than an acceptable deviation from electrical zero. A twenty-sixth embodiment can include the method of the seventeenth to twenty-fifth embodiments, wherein when the output signal from the first transformer and the output signal from the second transformer is greater than the acceptable deviation from electrical zero, the position of the first moveable core, the second moveable core, or the probe fitting is adjusted on the probe rod accordingly. A twenty-seventh embodiment can include the method of the seventeenth to twenty-sixth embodiments, further comprising one or more spacers, wherein the one or more spacers are configured to be disposed on the probe rod on either side of the first moveable core and the second moveable core. A twenty-eighth embodiment can include the method of the seventeenth to twenty-seventh embodiments, wherein one of the one or more spacers is a threaded end spacer, wherein the threaded end spacer is located at the opposite end of the probe rod from the probe fitting, and wherein the threaded end spacer comprises flats along half of the diameter to allow for adjustment along the length of the probe rod. A twenty-ninth embodiments can include the method of the seventeenth to twenty-eighth embodiments, wherein calibrating a single channel LVDT comprises: fixedly coupling a moveable core onto a probe rod, inserting the probe rod with a moveable core into a housing comprising one or more coils of wire, wherein the one or more coils of wire are arranged to form a transformer; aligning a position of the moveable core with respect to the transformer; and adjusting a position of a probe fitting on the probe rod with respect to the aligning of the position of the moveable core with respect to the transformer. A thirtieth embodiment can include the method of the seventeenth to twenty-ninth embodiments, wherein calibrating a dual parallel LVDT comprises: fixedly coupling a first moveable core onto a first probe rod; inserting the first probe rod with the first moveable core into a first channel of an outer housing comprising one or more coils of wire, wherein the one or more coils of wire are arranged to form a first transformer; aligning a position of the first moveable core with respect to the first transformer; adjusting a position of the first probe rod with respect to a probe fitting, wherein adjusting the position is based on the alignment of the position of the first moveable core with respect to the first transformer; fixedly coupling a second moveable core onto a second probe rod; inserting the second probe rod with the second moveable core into a second channel of the outer housing comprising one or more coils of wire, wherein the one or more coils of wire are arranged to form a second transformer, and wherein the second channel is configured to lay parallel to the first channel; aligning a position of the second moveable core with respect to the second transformer; and adjusting a position of the second probe rod with respect to the probe fitting, wherein adjusting the position is based on the alignment of the position of the second moveable core with respect to the second transformer.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for calibrating a linear variable differential transformer (LVDT), the method comprising:
    fixedly coupling a first moveable core on a probe rod;
    inserting the probe rod with the first moveable core into a housing comprising one or more coils of wire, wherein the one or more coils of wire are arranged to form a plurality of transformers;
    aligning a position of the first moveable core with respect to a first transformer of the plurality of transformers;
    adjusting a position of a probe fitting on the probe rod with respect to the aligning of the position of the first moveable core to the first transformer of the plurality of transformers;
    fixedly coupling the probe fitting to the probe rod; and
    adjusting a second moveable core on the probe rod, wherein the second moveable core is adjacent to a spacer of one or more spacers coupled to a first end of the probe rod.

2. The method of claim 1, further comprising aligning a position of the second moveable core with respect to a second transformer of the plurality of transformers.

3. The method of claim 2, wherein aligning the position of the second moveable core is based on aligning of the position of the first moveable core with respect to the first transformer.

4. The method of claim 2, wherein alignment of the second moveable core within the second transformer comprises sliding the second moveable core until electrical zero is achieved with respect to the second transformer.

5. The method of claim 2, further comprising fixedly coupling the second moveable core to the probe rod after aligning the position of the second moveable core relative to a second transformer of the plurality of transformers.

6. The method of claim 2, wherein when both the first moveable core and the second moveable core achieve electrical zero with respect to their respective transformers, a difference between an output signal of the first transformer and an output signal of the second transformer is less than an acceptable threshold level.

7. The method of claim 6, further comprising:
    calculating a deviation from the acceptable threshold level in case the difference between the output signal of the first transformer and the output signal of the second transformer is greater than the acceptable threshold level, and
    adjusting the position of the first moveable core, the second moveable core, or the probe fitting based on the calculated deviation.

8. The method of claim 6, wherein an average of an output signal from the first transformer and an average of an output signal from the second transformer is less than an acceptable deviation from electrical zero.

9. The method of claim 8, further comprising adjusting the position of the first moveable core, the second moveable core, or the probe fitting in case the output signal from the first transformer and the output signal from the second transformer is greater than the acceptable deviation from electrical zero.

10. The method of claim 1, wherein fixedly coupling the second moveable to the probe rod comprises at least one of: welding, brazing, crimping, adhesive, threading, or combinations thereof.

11. The method of claim 1, wherein the LVDT comprises a dual tandem LVDT.

12. The method of claim 1, wherein at least one end of the first moveable core and the second moveable core is permanently attached to the probe rod.

13. The method of claim 1, wherein inserting the probe rod into the housing comprises moving the probe rod into the housing until a current clamp is met.

14. The method of claim 1, wherein alignment of the first moveable core within the first transformer comprises sliding the first moveable core until electrical zero is achieved with respect to the first transformer.

15. The method of claim 1, wherein the one or more spacers are configured to be disposed on the probe rod on either side of the first moveable core and the second moveable core.

16. A method for calibrating a linear variable differential transformer (LVDT), the method comprising:
fixedly coupling a first moveable core onto a probe rod, inserting the probe rod with the first moveable core into a housing comprising one or more coils of wire, wherein the one or more coils of wire are arranged to form a plurality of transformers;
aligning a position of the first moveable core with respect to a first transformer of the plurality of transformers;
adjusting a position of a probe fitting on the probe rod with respect to the aligning of the position of the first moveable core to the first transformer of the plurality of transformers;
fixedly coupling the probe fitting to the probe rod;
adjusting a second moveable core on the probe rod;
aligning a position of the second moveable core with respect to a second transformer of the plurality of transformers based on the aligning of the position of the first moveable core to the first transformer; and
fixedly coupling the second moveable core to the probe rod after aligning the second moveable core relative to the second transformer.

17. The method of claim 16, wherein fixedly coupling the first moveable core, the second moveable core, and the probe fitting to the probe rod comprises at least one of: welding, brazing, crimping, adhesive, threading, or combinations thereof.

18. The method of claim 16, wherein alignment of the first moveable core within the first transformer and alignment of the second moveable core within the second transformer comprises sliding the first moveable core and the second moveable core until electrical zero is achieved with respect to the first transformer and the second transformer, respectively.

19. The method of claim 18, wherein when both the first moveable core and the second moveable core achieve electrical zero with respect to their respective transformers, a difference between an output signal of the first transformer and an output signal of the second transformer is less than an acceptable threshold level.

20. The method of claim 19, wherein when the difference between the output signal of the first transformer and the output signal of the second transformer is greater than the acceptable threshold level, a deviation from the acceptable threshold level is calculated, and the position of the first moveable core, the second moveable core, or the probe fitting is adjusted accordingly.

21. The method of claim 18, wherein an average of the output signal from the first transformer and an average of the output signal from the second transformer is less than an acceptable deviation from electrical zero.

22. The method of claim 21, wherein when the output signal from the first transformer and the output signal from the second transformer is greater than the acceptable deviation from electrical zero, the position of the first moveable core, the second moveable core, or the probe fitting is adjusted on the probe rod accordingly.

23. The method of claim 16, further comprising one or more spacers, wherein the one or more spacers are configured to be disposed on the probe rod on either side of the first moveable core and the second moveable core.

24. The method of claim 23, wherein one of the spacers is a threaded end spacer, wherein the threaded end spacer is located at opposite end of the probe rod from the probe fitting, and wherein the threaded end spacer comprises flats along half of the diameter to allow for adjustment along the length of the probe rod.

* * * * *